United States Patent
Ieda et al.

(10) Patent No.: US 7,201,219 B2
(45) Date of Patent: Apr. 10, 2007

(54) AUTOMOTIVE AIR-CONDITIONER OPERABLE UNDER COOLING, HEATING OR AIR-MIXING MODE

(75) Inventors: Hisashi Ieda, Kariya (JP); Mitsuyo Oomura, Kariya (JP)

(73) Assignee: DENSO Corporation, Kariya (JP)

( * ) Notice: Subject to any disclaimer, the term of this patent is extended or adjusted under 35 U.S.C. 154(b) by 249 days.

(21) Appl. No.: 10/682,142

(22) Filed: Oct. 9, 2003

(65) Prior Publication Data

US 2004/0068998 A1    Apr. 15, 2004

(30) Foreign Application Priority Data

Oct. 15, 2002    (JP)    ............... 2002-300281

(51) Int. Cl.
*B60H 1/00*    (2006.01)
*B60H 3/00*    (2006.01)

(52) U.S. Cl. .................. 165/202; 165/263; 165/264; 165/270; 165/42; 165/43

(58) Field of Classification Search .............. 165/202, 165/42, 43, 270, 263, 264
See application file for complete search history.

(56) References Cited

U.S. PATENT DOCUMENTS

| 4,365,663 A | * | 12/1982 | Inoue et al. ................ 165/202 |
| 4,466,480 A | * | 8/1984 | Ito et al. ..................... 165/202 |
| 4,482,007 A | * | 11/1984 | Yoshimi et al. ............. 165/225 |
| 4,832,258 A | * | 5/1989 | Hoshino et al. .............. 236/13 |
| 4,899,809 A | * | 2/1990 | Takenaka et al. ........... 165/202 |
| 2002/0134540 A1 | | 9/2002 | Ieda et al. |

FOREIGN PATENT DOCUMENTS

| JP | 57118910 A | * | 7/1982 |
| JP | 58188714 A | * | 11/1983 |
| JP | 02114013 A | * | 4/1990 |
| JP | 07089326 A | * | 4/1995 |

* cited by examiner

*Primary Examiner*—John K. Ford
(74) *Attorney, Agent, or Firm*—Harness, Dickey & Pierce, PLC

(57) ABSTRACT

An air-conditioner is operated under one mode selected from among three modes, i.e., a cooling mode, a heating mode and an air-mixing mode. Conditioned air temperature is controlled by changing a cooling ability in the cooling mode, a heating ability in the heating mode, and a position of an air-mixing door in the air-mixing mode. When the operating mode is switched to the cooling mode or to the heating mode from another mode, the position of the air-mixing door is gradually changed to prevent an abrupt temperature drop or rise until a difference between a target temperature and an actual temperature becomes smaller than a predetermined value.

9 Claims, 10 Drawing Sheets

FIG. 9

| | COOLING MODE | AIR-MIXING MODE | HEATING MODE |
|---|---|---|---|
| Teo | Teo=Tao | f(Tam) | f(Tam) |
| Two | | Two=50°C OR CALCULATED TARGET (WHICHEVER HIGHER) | $T_{wo} = \dfrac{T_{ao}-T_e}{\phi} + T_e$ |
| SW | SW=0% | $SW = \dfrac{T_{ao}-T_e}{T_w-T_e} \times 100\%$ | SW=100% |
| WATER PUMP | OFF | ON | ON |

AUTOMOTIVE AIR-CONDITIONER OPERABLE UNDER COOLING, HEATING OR AIR-MIXING MODE

CROSS-REFERENCE TO RELATED APPLICATION

This application is based upon and claims benefit of priority of Japanese Patent Application No. 2002-300281 filed on Oct. 15, 2002, the content of which is incorporated herein by reference.

BACKGROUND OF THE INVENTION

1. Field of the Invention

The present invention relates to an air-conditioner for use in an automotive vehicle, the air-conditioner having a heater for heating air to be supplied to a passenger compartment, the heater being powered by heat sources, such as electricity, other than waste heat of an internal combustion engine. The air-conditioner is suitably used in an electric vehicle powered by a fuel cell or in a so-called hybrid vehicle powered by a combination of an internal combustion engine and an electric battery.

2. Description of Related Art

A conventional air-conditioner mounted on a vehicle powered by an internal combustion engine includes a heater utilizing waste heat of the engine and a refrigeration circuit driven by the engine. Air introduced into the air-conditioner is first cooled by an evaporator of the refrigeration circuit. Part of the cooled air is led to the heater to reheat the cooled air, and the other part of the cooled air is directly supplied to a passenger compartment, bypassing the heater. An amount of the cooled air bypassing the heater is controlled by an air-mixing door to thereby control temperature of the air supplied to the passenger compartment.

In the air-conditioner for the electric vehicle or the hybrid vehicle, it is impossible or difficult to utilize the waste heat from the engine for the heater. Therefore, an electric heater or a combustion heater is used in such an air-conditioner. If the temperature of the air supplied to the passenger compartment is controlled in the same manner as in the conventional air-conditioner, i.e., by mixing the cooled air and the heated air, a large amount of electric power is required for heating and for operating the refrigeration cycle.

In order to cope with this problem, a proto-type air-conditioner that is selectively operable under three modes is made and tested. The three modes are: a cooling mode in which the temperature of the air supplied to the passenger compartment is solely controlled by adjusting a cooling ability of an evaporator in a refrigeration circuit; a heating mode in which the air temperature is solely controlled by adjusting a heating ability of the heater; and an air-mixing mode in which the air temperature is controlled by mixing the cooled air and the heated air.

Following problems have been found in the proto-type air-conditioner. That is, when the operating mode is switched from the heating mode or the air-mixing mode to the cooling mode, the temperature of the air supplied to the passenger compartment is abruptly changed to a lower temperature. This is because the heated air flowing through the heater abruptly disappears upon switching the operation mode to the cooling mode. This makes passengers uncomfortable. Similar problems are found when the operating mode is switched from the cooling mode or the air-mixing mode to the heating mode. The temperature of the air supplied to the passenger compartment is abruptly changed to a higher temperature upon switching the mode to the heating mode, because the cooled air flowing through the evaporator abruptly disappears. This is detrimental to comfort of the passengers.

SUMMARY OF THE INVENTION

The present invention has been made in view of the above-mentioned problems, and an object of the present invention is to provide a new air-conditioner in which abrupt temperature changes occurring upon switching the operating modes are eliminated.

An air-conditioner for use in an automotive vehicle includes an evaporator for cooling air, a heater for heating air, and an air-mixing door for mixing the cooled air with the heated air. The evaporator is a heat-exchanger disposed at a low pressure side of a vapor-compression-type refrigeration circuit, and the heater is a heating device through which hot water heated by an electric heater circulates.

The air-conditioner is selectively operated under one of three modes, i.e., a cooling mode, a heating mode and an air-mixing mode. In the cooling mode, temperature of the air to be supplied to the passenger compartment is controlled by controlling a cooling ability of the evaporator. In the heating mode, the air temperature is controlled by controlling an electric power for heating hot water circulating through the heater. In the air-mixing mode, the air temperature is controlled by changing a mixing ratio of the cooled air relative to the heated air.

When the operating mode is switched to the cooling mode from another mode, an amount of cooled air is gradually increased by gradually changing the position of the air-mixing door. It is preferable to gradually change the position of the air-mixing door until an absolute value of a difference between a target temperature and an actual temperature of the cooled air becomes smaller than a predetermined value (e.g., 5° C.). In this manner, an abrupt temperature drop otherwise occurring during a transitional period from another mode to the cooling mode can be suppressed or eliminated. The transitional period in which the position of the air-mixing door is gradually changed may be adjusted according to an ambient temperature and an amount of air introduced into the air-conditioner.

When the operating mode is switched to the heating mode from another mode, an amount of heated air is gradually increased by gradually changing the position of the air-mixing door. It is preferable to gradually change the position of the air-mixing door until an absolute value of a difference between a target temperature and an actual temperature of the heated air becomes smaller than a predetermined value (e.g., 4° C.). The heated air temperature may be represented by a temperature of hot water supplied to the heater. In this manner, an abrupt temperature rise otherwise occurring during a transitional period from another mode to the heating mode can be suppressed or eliminated.

The abrupt temperature changes otherwise occurring upon changing the operating modes, especially in the air-conditioner using an electric heater, are eliminated or suppressed according to the present invention. Other objects and features of the present invention will become more readily apparent from a better understanding of the preferred embodiment described below with reference to the following drawings.

BRIEF DESCRIPTION OF THE DRAWINGS

FIG. 9 is a table showing a summary of three operating modes;

DETAILED DESCRIPTION OF THE PREFERRED EMBODIMENT

Figure 1:
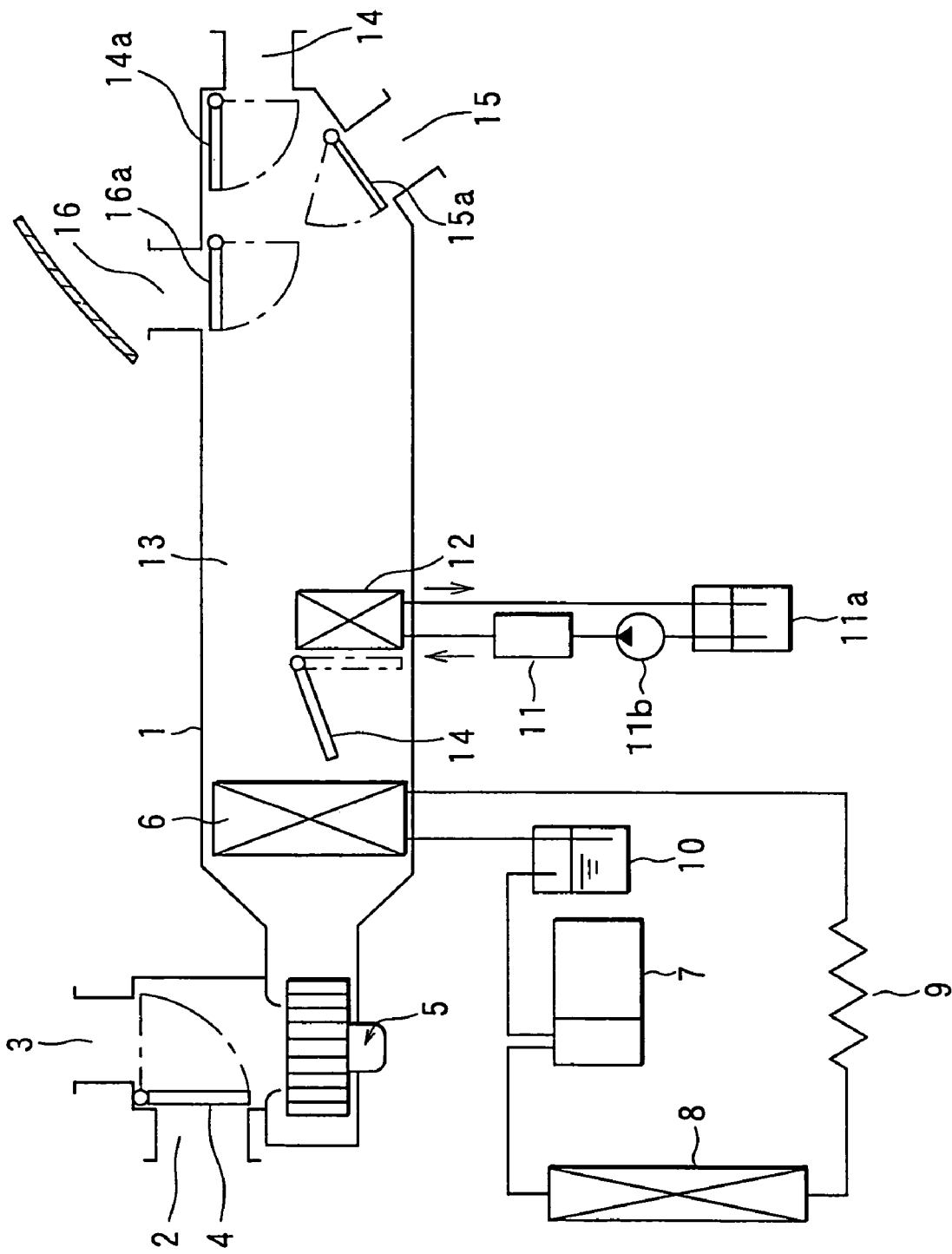
FIG. 1 is a schematic diagram briefly showing an entire structure of an air-conditioner according to the present invention.

A preferred embodiment of the present invention will be described with reference to FIGS. 1–10B. First, referring to FIG. 1, an entire structure of an air-conditioner for use in an automotive vehicle will be described. The air conditioner is mainly composed of an air-conditioner casing 1 that includes various components, a refrigeration circuit including an evaporator 6 disposed in the casing 1, and a heating circuit including a heater 12 disposed in the casing 1.

The casing 1 is a duct forming an air passage. At an upstream end of the casing 1, an inlet port 2 for introducing air from a passenger compartment and another inlet port 3 for introducing outside air are formed. An amount of the outside air relative to the inside air is controlled by a switching door 4. A blower 5 (a centrifugal fan) is disposed in the vicinity of the inlet ports 2, 3 to send air introduced from the inlet ports 2, 3 into the casing 1.

The refrigeration circuit is a known circuit composed of a compressor 7 driven by an electric motor, a condenser 8, depressurizer 9 such as a capillary tube or a fixed orifice, an evaporator 6, and a vapor-liquid separator 10, all these components being connected in series in this order. Refrigerant circulating in the refrigeration circuit is compressed in the compressor 7; the compressed refrigerant is cooled in the condensor 8; the cooled refrigerant is depressurized in the depressurizer 9; the refrigerant is vaporized in the evaporator 6 to thereby cool the air introduced into the casing 1; the refrigerant is returned to the vapor-liquid separator 10; and then the vapor refrigerant is again supplied to the compressor 7. The evaporator 6 constitutes a heat-exchanger disposed at a low pressure side of the refrigeration circuit. The cooling ability of the evaporator 6 is controlled by changing rotational speed of the electric motor connected to the compressor 7.

The heater 12 is disposed downstream of the evaporator 6. Water pumped up by an electric pump 11b from a reservoir 11a is heated in an electric heater 11. The hot water heated in the electric heater 11 is supplied to the heater 12 disposed in the casing 1. A bypass passage 13 through which the air cooled by the evaporator 6 flows, bypassing the heater 12, is formed in the casing 1. An amount air flowing through the bypass passage 13 is controlled by an air-mixing door 14. When the air-mixing door 14 fully closes the bypass passage 13, all the air cooled by the evaporator 6 is re-heated by the heater 12. On the other hand, when the heater 12 is fully closed by the air-mixing door 14, all the air cooled by the evaporator 6 flows through the bypass passage without being heated by the heater 12. When the air-mixing door 14 is at an intermediate position, the air cooled by the evaporator 6 and the air heated by the heater 12 are mixed at an downstream position of the heater 12.

At a downstream end of the casing 1, three outlets are formed: a face-outlet 14 for blowing conditioned air toward an upper portion of passengers; a foot-outlet 15 for blowing conditioned air toward a foot portion of passengers; and a defroster-outlet 16 for blowing conditioned air toward a windshield. Opening degrees of these outlets 14, 15, 16 are controlled by respective switching doors 14a, 15a, 16a, respectively.

Figure 2:
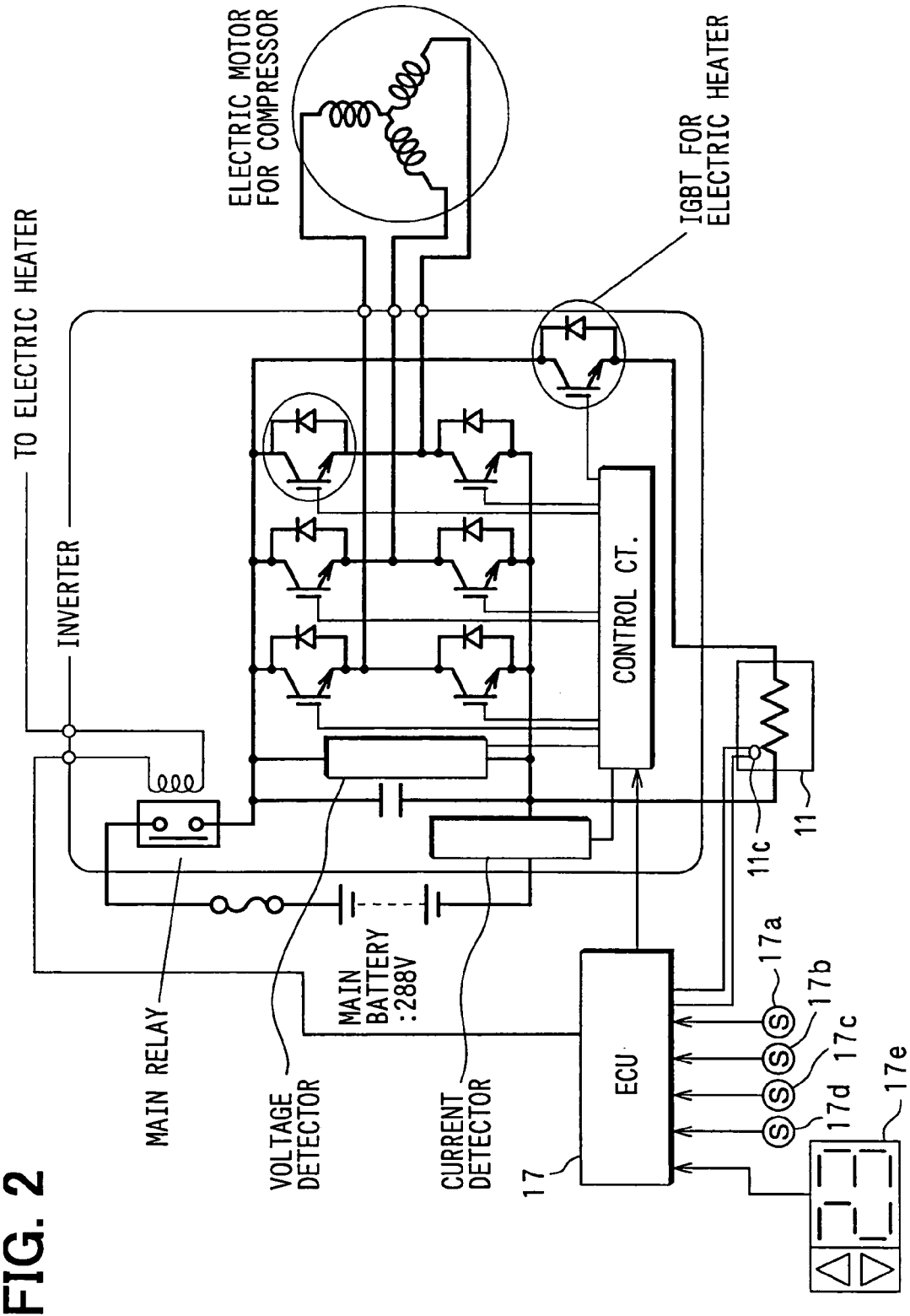
FIG. 2 is a diagram showing an electric circuit for controlling the air-conditioner.

FIG. 2 shows an electric circuit for controlling operation of the air-conditioner. The electric motor for driving the compressor 7 and the electric heater 11 for heating the water to be supplied to the heater 12 are controlled by an electronic control unit (ECU) 17. The circuit includes an inverter for driving the electric motor in a controlled manner, an IGBT for supplying electric current to the electric heater 11 in a controlled manner, a main relay for preventing excessive current in the circuit, and other associated components. Temperature (Tw) of the hot water heated by the electric heater 11 is detected by a water temperature sensor 11c.

Various sensors are connected to the ECU 17: a temperature sensor 17a for detecting an atmospheric temperature (Tam); a temperature sensor 17b for detecting a temperature (Te) of the air cooled by the evaporator 6 (Te is also referred to as a temperature after evaporator); a temperature sensor 17c for detecting a temperature (Tr) in the passenger compartment; and a sunshine sensor 17d for detecting an amount of the sunshine. Outputs from all of these sensors are fed to the ECU 17. A desired temperature (Tset) is input by a passenger to a control panel 17e which is also connected to the ECU 17.

The air-conditioner described above is operated under one of three operating modes: a cooling mode, a heating mode and an air-mixing mode. Operation of the air-conditioner under respective modes will be described below.

(Cooling Mode)

In this mode, the air-mixing door 14 is positioned to fully close the passage to the heater 12, so that all the air cooled by the evaporator 6 flows through the bypass passage 13. The temperature of conditioned air is controlled by adjusting the cooling ability of the evaporator 6. More particularly, upon turning on an air-conditioner switch, a desired temperature Tset inputted to the control panel 17e and outputs from all the sensors are read out by the ECU 17. A target temperature Tao of the conditioned air is calculated according to the following formula:

$$Tao = (Kset \times Tset) - (Kr \times Tr) - (Kam \times Tam) - (Ks \times Ts) + C \quad (1)$$

where Tr is a temperature in the passenger compartment detected by the sensor 17c; Tam is an ambient temperature detected by the sensor 17a; Ts is an output of the sunshine sensor 17d; Kset, Kr, Kam and Ks are control gains; and C is an adjusting constant. A temperature Tin of the air supplied to the evaporator 6 is calculated according to the following formula:

$$Tin = (\alpha \times Tam) + (1-\alpha) \times Tr \quad (2)$$

where α is a ratio of the outside air to a total amount of air introduced into the casing 1. Then, a difference between Tao and Tin (Tao−Tin), referred to as an air-conditioning index, is calculated.

Figure 3:
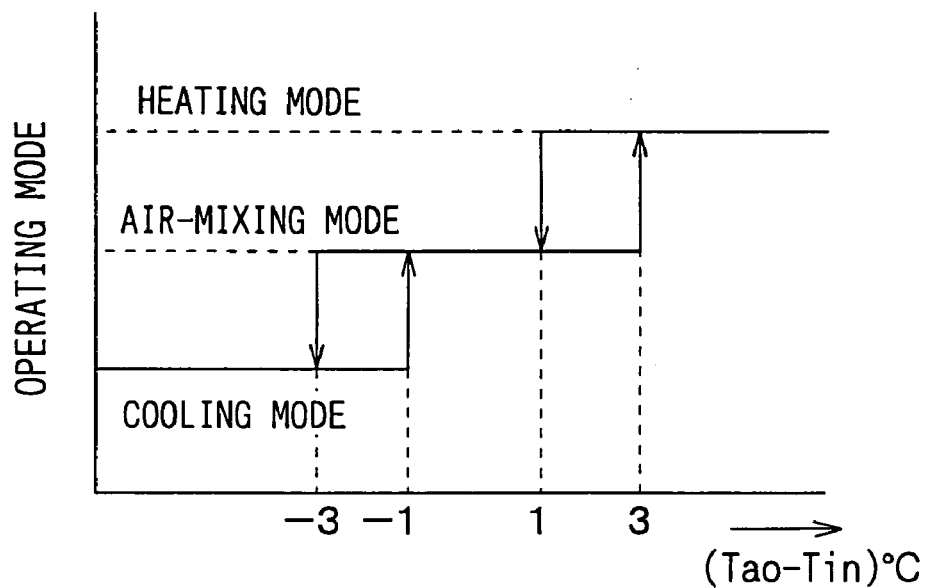
FIG. 3 is a graph showing conditions of switching operating modes of the air-conditioner.

When the air-conditioning index (Tao−Tin) reaches a predetermined level, the air-conditioner is operated under the cooling mode. More particularly, as shown in FIG. 3, in the situation where the index is descending, the cooling mode is performed when the index becomes −3(° C.) or lower. In the situation where the index is ascending, the cooling mode is switched to the other mode when the index reaches −1. In other words, the operating modes are switched with a certain hysteresis.

Under the cooling mode, the electric heater 11 and the water pump 11b are not operated except when the operating mode is switched to the cooling mode from another mode. When the operating mode is switched to the cooling mode, only the pump 11b is operated until the air-mixing door 14 fully closes the heater 12 (i.e., until an opening degree SW of the air-mixing door 14 becomes 0%).

(Heating Mode)

In the situation where the air-conditioning index (Tao−Tin) is ascending, the heating mode is performed when the index becomes 3 or higher, as shown in FIG. 3. In the situation where the index is descending, the heating mode is switched to another mode (mostly to an air-mixing mode) when the index reaches 1. Under the heating mode, the air-mixing door 14 is positioned to fully close the bypass passage 13, so that all the air sent from the blower 5 flows through the heater 12. The temperature of the conditioned air is controlled by adjusting the temperature of the hot water supplied to the heater 12.

If the air-conditioner is operated under the heating mode when the ambient temperature is low, the windshield would be frosted if the air taken into the casing 1 is not dehumidified. In order to dehumidify the air taken into the casing 1, the air is cooled by the evaporator 6 before it is heated by the heater 12 in this embodiment. In other words, the evaporator 6 is operated even under the heating mode.

Figure 4:
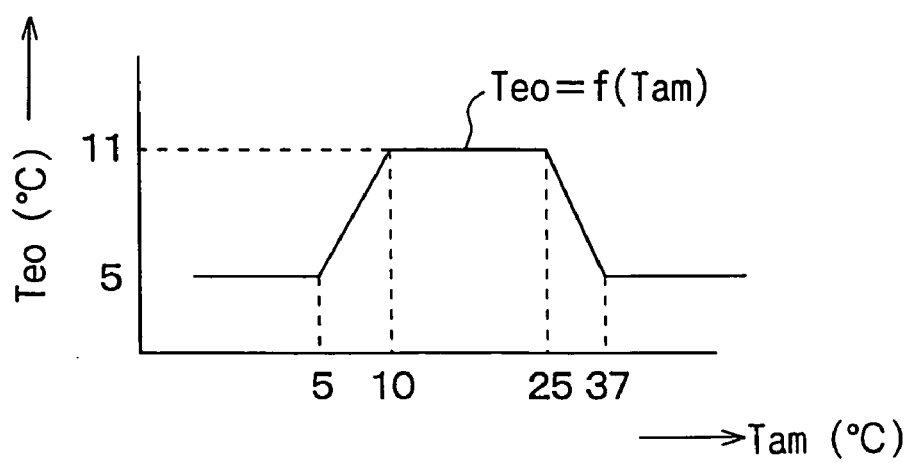
FIG. 4 is a graph showing a way of calculating a target temperature of air cooled by an evaporator according to ambient temperature.
Figure 5:
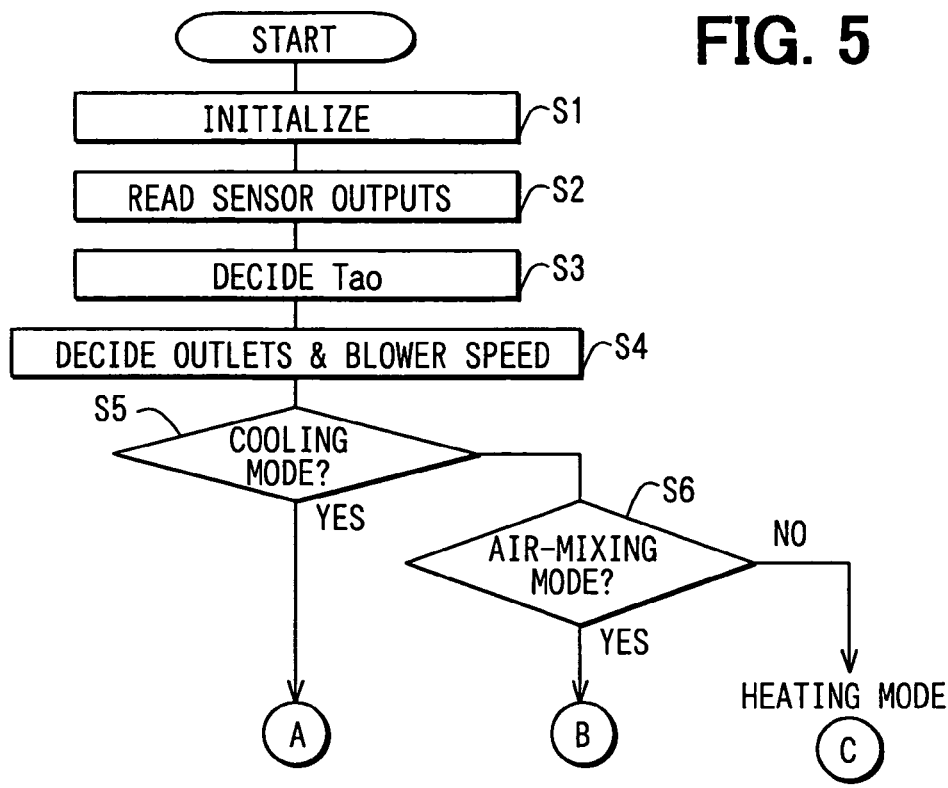
FIG. 5 is a flowchart showing a process of selecting an operating mode from among three modes.
Figure 6:
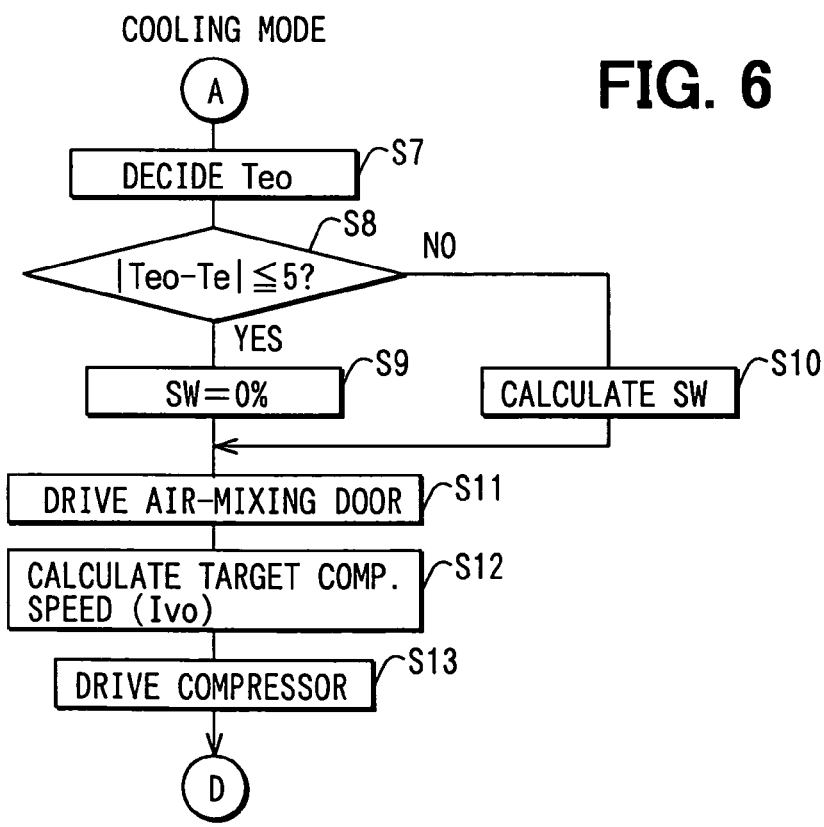
FIG. 6 is a flowchart showing a control process performed under a cooling mode.
Figure 7:
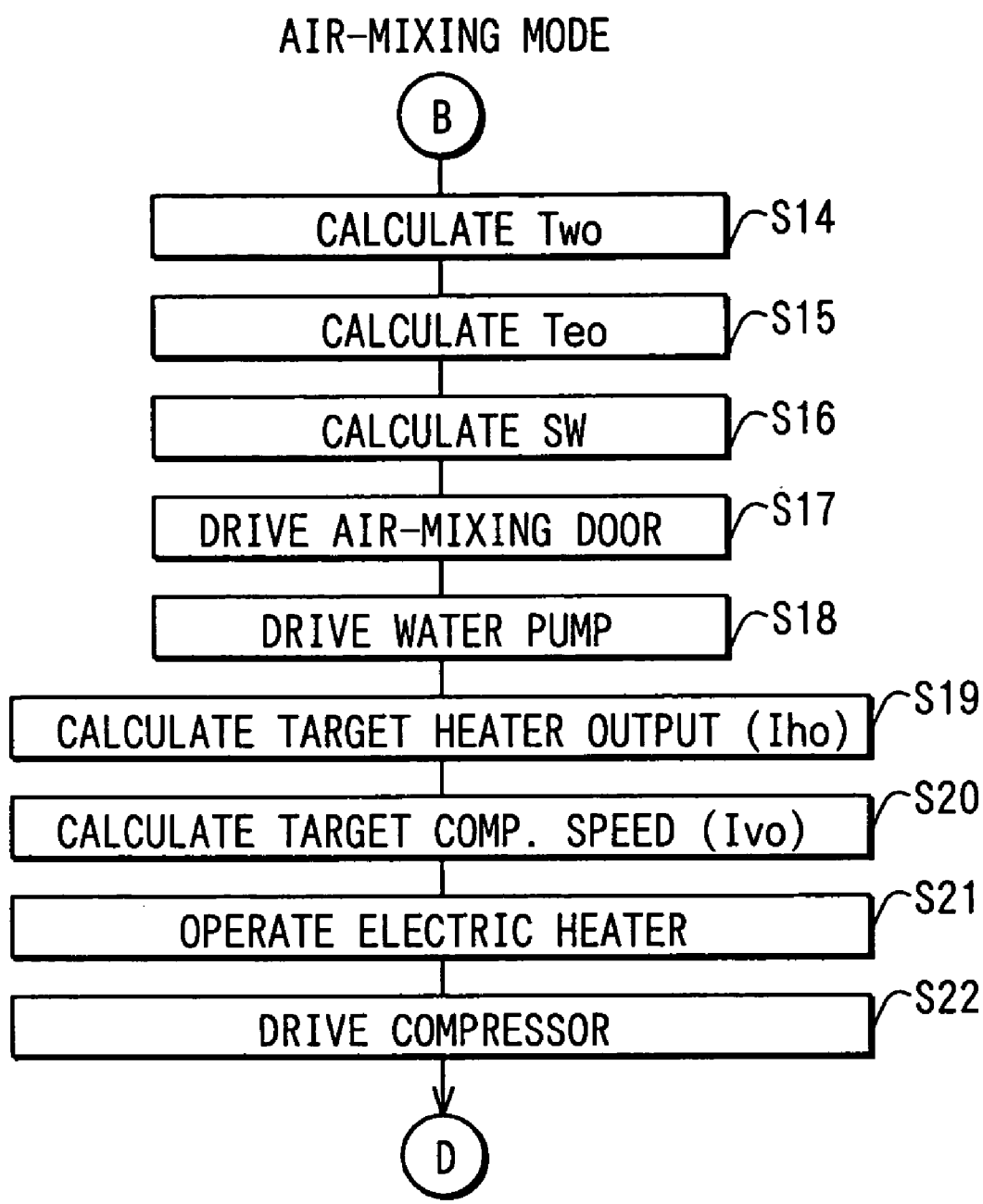
FIG. 7 is a flowchart showing a control process performed under an air-mixing mode.

The electric heater 11 is controlled so that a temperature of the hot water circulating in the heater 12 becomes a target temperature Two. The target temperature Two of the hot water is calculated according to the following formula:

$$Two = (Tao - Te)/\phi + Te \quad (3)$$

where Te is a temperature of the air after the evaporator 6, which is detected by the temperature sensor 17b, and φ is a heat-exchange efficiency. The cooling ability of the evaporator 6 is controlled to realize the target temperature Teo which is determined according to the ambient temperature Tam, as shown in FIG. 4.

(Air-Mixing Mode)

In the situation where the air-conditioning index (Tao−Tin) is ascending, the operating mode is switched from the cooling mode to the air-mixing mode when the index becomes −1, and switched from the air-mixing mode to the heating mode when the index becomes 3, as shown in FIG. 3. In the situation where the index is descending, the operation mode is switched from the heating mode to the air-mixing mode when the index becomes 1, and switched from the air-mixing mode to the cooling mode when the index becomes −3. Under the air-mixing mode, the temperature Tr of the conditioned air supplied to the passenger compartment is controlled by adjusting the position (or opening angle SW) of the air-mixing door 14. An amount of the cooled air relative to the heated air is controlled by adjusting the position of the air-mixing door 14. The air-mixing mode is mainly performed in intermediate seasons, spring and autumn, and for dehumidifying the air taken into the air-conditioner casing.

Under the air-mixing mode, the temperature of the hot water circulating in the heater 12 is controlled to the level of Two calculated according to the above formula (3) or to 50° C., whichever higher. The hot water temperature is controlled by controlling power supplied to the electric heater 11. The opening degree SW of the air-mixing door 14 is determined according to the following formula:

$$SW = (Tao - Te)/(Tw - Te) \times 100\% \quad (4)$$

where Tw is a hot water temperature detected by the water temperature sensor 11c.

(Transition Period to Cooling Mode)

When the operating mode is switched to the cooling mode from another mode, the opening degree SW of the air-mixing door 14 is gradually decreased until an absolute value of a difference between the target temperature and the actual temperature of the air cooled by the evaporator 6 (i.e., |Teo−Te|) becomes smaller than a predetermined value, so that that the amount of the cooled air does not abruptly increase. In this manner, an abrupt temperature change otherwise occurring upon switching the operating modes is avoided. The predetermined value is set to 5° C. in this embodiment.

(Transition Period to Heating Mode)

When the operating mode is switched to the heating mode from another mode, the opening degree SW of the air-mixing door 14 is gradually increased until an absolute value of a difference between the target temperature and the actual temperature of hot water in the heater 12 (i.e., |Two−Tw|) becomes smaller than a predetermined value, so that that the amount of the heated air does not abruptly increase. In this manner, an abrupt temperature change otherwise occurring upon switching the operating modes is avoided. The predetermined value is set to 4° C. in this embodiment.

Figure 8:
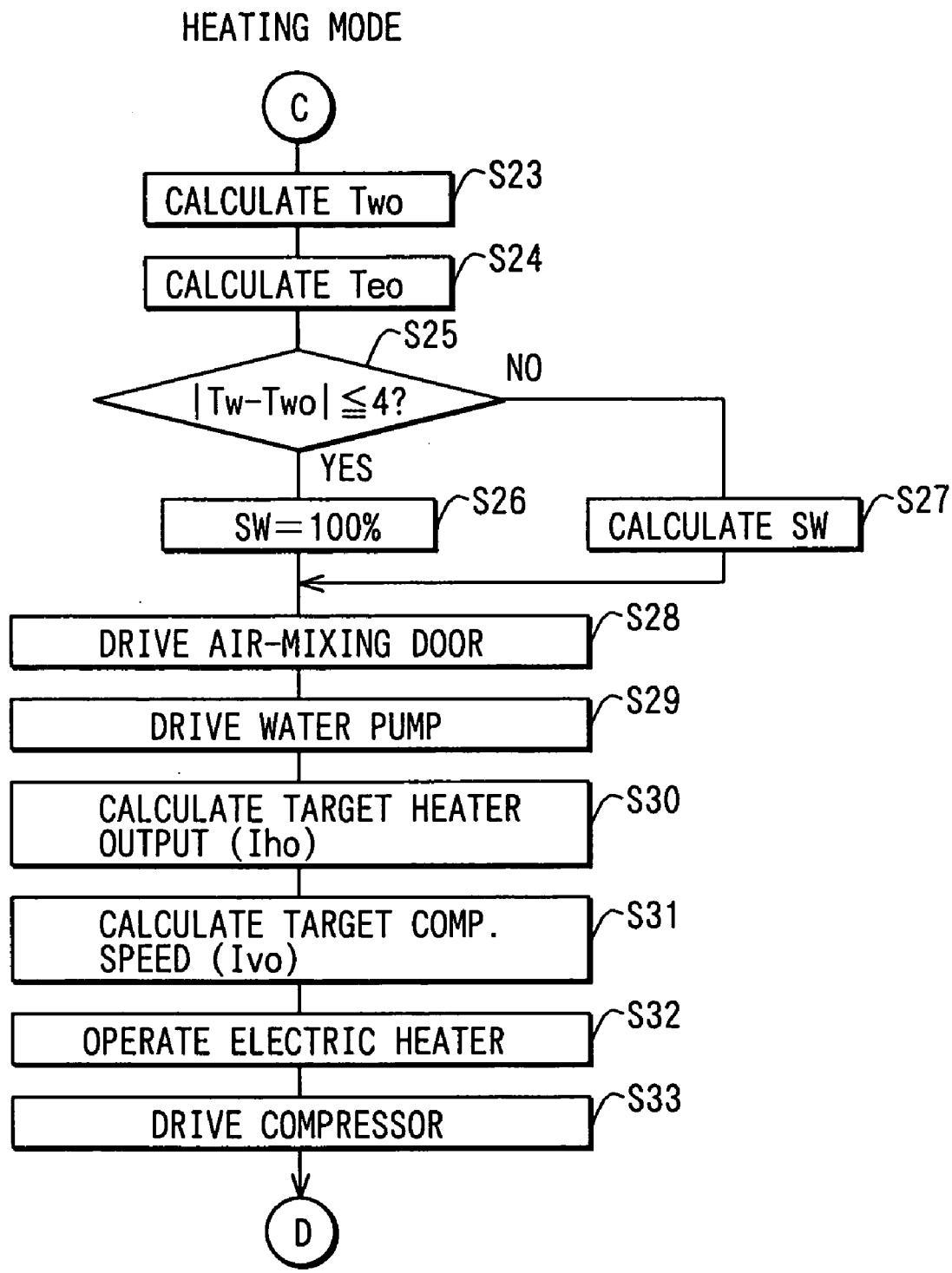
FIG. 8 is a flowchart showing a control process performed under a heating mode.

The processes of controlling the air conditioner under respective operating modes are shown in the flowcharts of FIGS. 5–8. A summary of operations under the respective modes is shown in the table of FIG. 9. According to the process shown in FIG. 1, one of the operating modes (i.e., the cooling mode, the air-mixing mode or the heating mode) is selected. When the cooling mode is selected, the air-mixing door 14 and the compressor 7 are driven according to the process shown in FIG. 6. When the air-mixing mode is selected, the electric heater 11, the compressor 7 and the air-mixing door 14 are operated in a controlled manner according to the process shown in FIG. 7. When the heating mode is selected, the electric heater 11 and other components are controlled as shown in FIG. 8.

In the table of FIG. 9, Teo (the target temperature of air cooled by the evaporator 6), Two (the target temperature of the hot water), SW (the opening degree of the air-mixing door 14), and ON or OFF of the water pump 11b are shown for each operating mode.

Figure 10A:
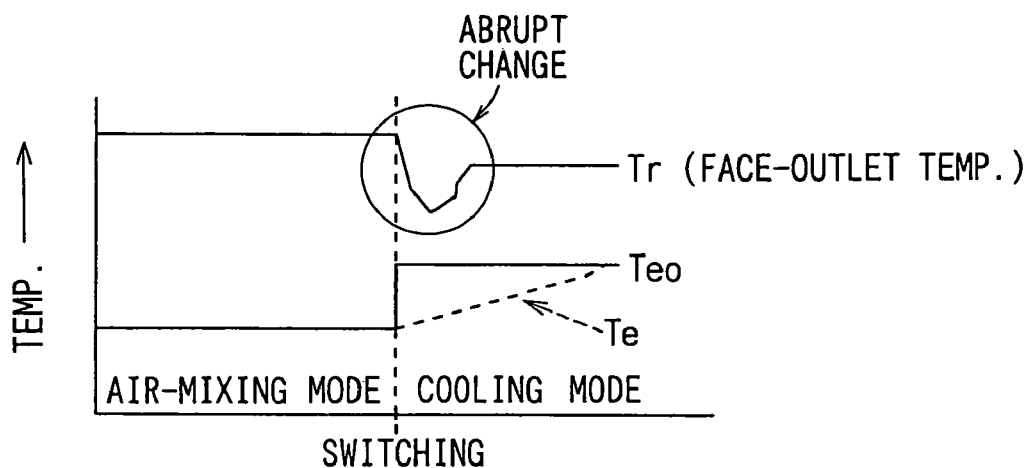
FIG. 10A is a graph for explaining an abrupt temperature drop that occurs when the operating mode is switched from the air-mixing mode to the cooling mode.

As shown in FIG. 3, it is highly possible that the operating mode is switched to the cooling mode from the air-mixing mode. It is also highly possible that the operating mode is switched to the heating mode from the air-mixing mode. If the air-mixing door 14 is abruptly closed (SW→0%), when the operation is switched to the cooling mode, Tr (a temperature of the conditioned air blown out of the face-outlet 14) abruptly changes as illustrated in FIG. 10A. This is because Te (the temperature of the air cooled by the evaporator 6) is much lower than Tr. The abrupt temperature change is detrimental to passenger's comfort. According to the present invention, the air-mixing door 14 is gradually closed when the operation is switched to the cooling mode. Thus, the abrupt temperature change is avoided.

Figure 10B:
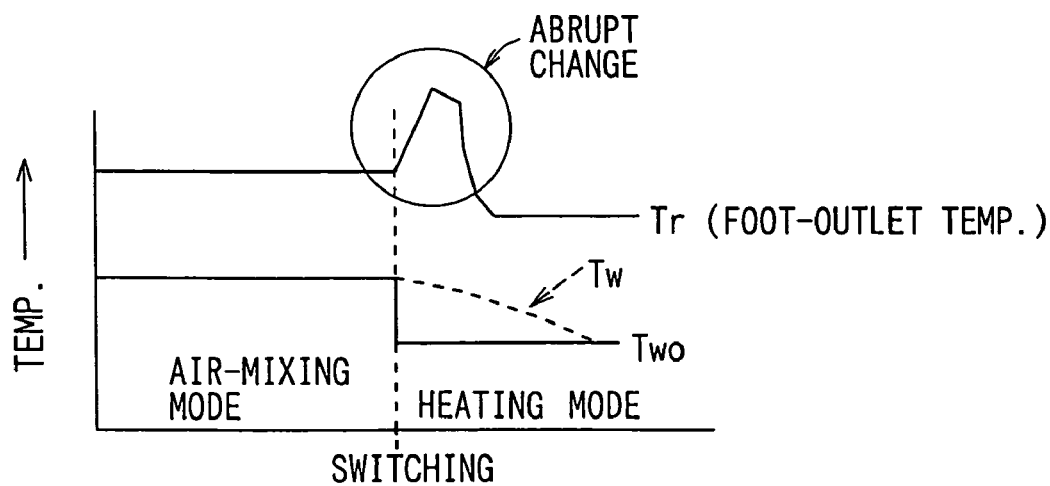
FIG. 10B is a graph for explaining an abrupt temperature rise that occurs when the operating mode is switched from the air-mixing mode to the heating mode.

Similarly, if the air-mixing door 14 is abruptly opened (SW→100%), when the operation is switched to the heating mode, Tr (a temperature of the conditioned air blown out of the foot-outlet 15) abruptly changes as illustrated in FIG. 10B. This is because the cool air flowing through the bypass passage 13 abruptly disappears, and the hot water temperature Tw does not immediately follow the target hot water temperature Two. The abrupt temperature change is detrimental to passenger's comfort. According to the present invention, the air-mixing door 14 is gradually opened to a fully opened position (SW=100%) when the operation is switched to the cooling mode. Thus, the abrupt temperature change is avoided.

When the operation is switched to the cooling mode, the air-mixing door 14 is gradually closed toward the fully closed position until |Teo−Te| becomes smaller than a predetermined value (e.g., 5° C.). When the operation is switched to the heating mode, the air-mixing door 14 is gradually opened toward the fully open position until |Two−Tw| becomes smaller than another predetermined value (e.g., 4° C.). In these transitional periods, the opening degree SW of the air-mixing door 14 is controlled according to the formula (4) shown above.

Figure 11:
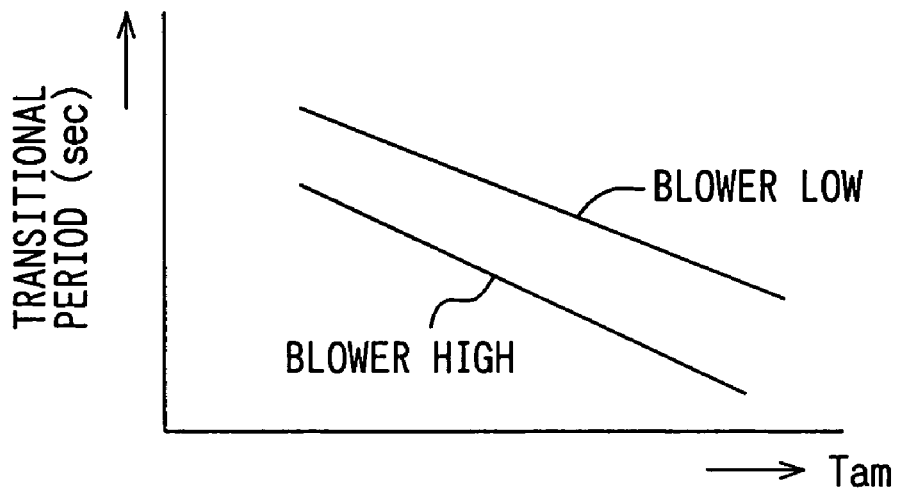
FIG. 11 is a graph showing a way of setting a transitional time for controlling the air-mixing door according to ambient temperature upon switching the operating mode to the cooling mode.

The present invention is not limited to the embodiment described above, but it may be variously modified. For example, the transitional periods in which the air-mixing door 14 is gradually closed or opened may be varied according to the ambient temperature Tam. The transitional period in switching to the cooling mode may be changed according to the graph shown in FIG. 11. That is, the transitional period is controlled so that it becomes shorter as the ambient temperature becomes higher and an amount of air sent by the blower becomes larger.

Figure 12:
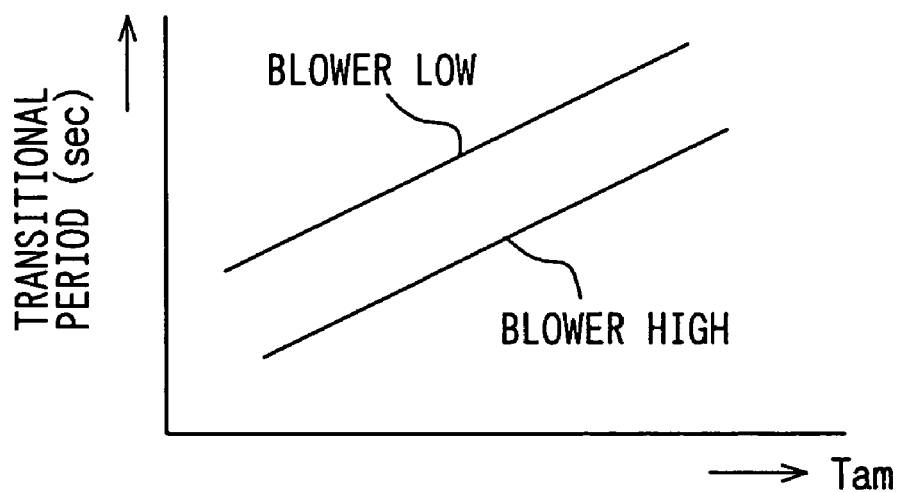
FIG. 12 is a graph showing a way of setting a transitional time for controlling the air-mixing door according to ambient temperature upon switching the operating mode to the heating mode.

The transitional period in switching to the heating mode may be changed according to the graph shown in FIG. 12. That is, the transitional period is controlled so that it becomes longer as the ambient temperature becomes higher and an amount of air sent by the blower 5 becomes smaller.

Figure 13:
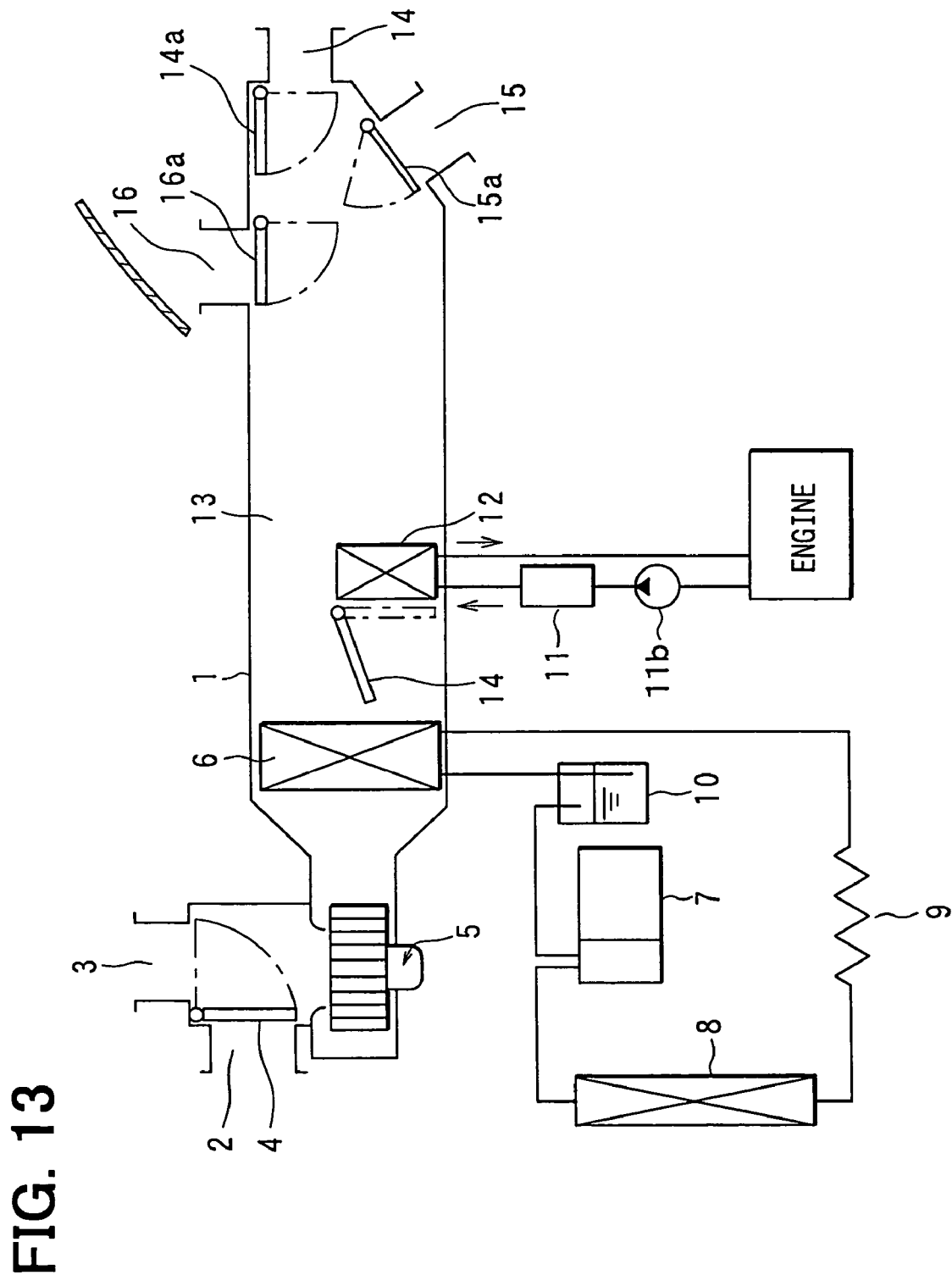
FIG. 13 is a schematic diagram showing an alternative structure of the air-conditioner.

In the air-conditioner shown in FIG. 1, the hot water circulated in the heater 12 is heated solely by the electric heater 11. It is also possible to additionally heat water supplied from a water jacket of an internal combustion engine. An entire structure of the air-conditioner of this type is shown in FIG. 13.

The present invention may be further modified as exemplified below. Though the electric heater 11 is used for heating the hot water circulating the heater 12 in the foregoing embodiment, it is also possible to use a combustion heater. Though the air in the air-conditioner casing 1 is heated by the hot water, it is possible to directly heat the air. Though a plate-shaped door is used as the air-mixing door 14, a film-type door may be used. The transitional period in switching to the cooling mode or the heating mode may be fixed to a constant period of time. Though the vapor-compression-type refrigeration cycle is used in the foregoing embodiment, it is possible to use other types of refrigeration cycle, such as an absorption-type. The present invention may be applicable also to air-conditioners other than the automotive air-conditioners.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An automotive air-conditioner comprising:
   an evaporator for cooling air to be supplied to a passenger compartment;
   a heater for heating air to be supplied to the passenger compartment;
   an air-mixing door for mixing the air cooled by the evaporator with the air heated by the heater; and
   a controller for controlling the evaporator, the heater and the air mixing door, the controller comprising:
   means for operating the air-conditioner in a cooling mode in Which the air mixing door is fully closed and temperature of the air to be supplied to the passenger compartment is controlled by controlling a cooling ability of the evaporator;
   means for operating the air-conditioner in a heating mode in which the air-mixing door is fully opened and temperature of the air to be supplied to the passenger compartment is controlled by controlling a heating ability of the heater;
   means for operating the air-conditioner in an air-mixing mode in which the cooling ability of the evaporator and the heating ability of the heater are controlled while controlling positions of the air-mixing door; and
   means for selecting either one of the cooling mode, the heating mode or the air-mixing mode; wherein
   when an operating mode of the air-conditioner is switched to the cooling mode from either the heating mode or the air-mixing mode, the positions of the air-mixing door are controlled to gradually increase an amount of the cooled air to be supplied to the passenger compartment to avoid an abrupt temperature drop due to a delay of the evaporator responding to the mode switching; and
   the positions of the air-mixing door are controlled to gradually increase the amount of the cooled air to be supplied to the passenger compartment until an absolute value of a difference between a target temperature and an actual temperature of the air cooled by the evaporator becomes smaller than a predetermined value that is a positive non-zero value.

2. The automotive air-conditioner as in claim 1, wherein:
   the evaporator is a heat exchanger disposed at a low pressure side of a vapor-compression-type refrigeration circuit that includes a compressor driven by an electric motor; and
   the heater is a heating device through which hot water heated by an electric heater circulates.

3. The automotive air-conditioner as in claim 1, wherein the heater is an electric heater.

4. An automotive air-conditioner comprising:
an evaporator for cooling air to be supplied to a passenger compartment;
a heater for heating air to be supplied to the passenger compartment;
an air-mixing door for mixing the air cooled by the evaporator with the air heated by the heater; and
a controller for controlling the evaporator, the heater and the air mixing door, the controller comprising:
means for operating the air-conditioner in a cooling mode in which the air-mixing door is fully closed and temperature of the air to be supplied to the passenger compartment is controlled by controlling a cooling ability of the evaporator;
means for controlling the air-conditioner in a heating mode in which the air-mixing door is fully opened and temperature of the air to be supplied to the passenger compartment is controlled by controlling a heating ability of the heater;
means for operating the air-conditioner in an air-mixing mode in which the cooling ability of the evaporator and the heating ability of the heater are controlled while controlling positions of the air-mixing door; and
means for selecting either one of the cooling mode, the heating mode or the air-mixing mode; wherein
when an operating mode of the air-conditioner is switched to the heating mode from either the cooling mode or the air-mixing mode, the positions of the air-mixing door are controlled to gradually increase an amount of the heated air to be supplied to the pressure compartment to avoid an abrupt temperature rise due to a delay of the heater responding to the mode switching; and
the positions of the air-mixing door are controlled to gradually increase the amount of the heated air to be supplied to the passenger compartment until an absolute value of a difference between a target temperature and an actual temperature of the air heated by the heater becomes smaller than a predetermined value that is a positive non-zero value.

5. The automotive air-conditioner as in claim 4, wherein:
the target temperature of the air heated by the heater is represented by a target temperature of hot water circulating the heater, and the actual temperature of the air heated by the heater is represented by a temperature of the hot water actually detected.

6. The automotive air-conditioner as in claim 4, wherein;
the evaporator is a heat exchanger disposed at a low pressure side of a vapor-compression-type refrigeration circuit that Includes a compressor driven by an electric motor; and
the heater is a heating device through which hot water heated by an electric heater circulates.

7. The automotive air-conditioner as in claim 4, wherein the heater is an electric heater.

8. An automotive air-conditioner comprising:
an evaporator for cooling air to be supplied to a passenger compartment;
a heater for heating air to be supplied to the passenger compartment;
an air-mixing door for mixing the air cooled by the evaporator with the air heated by the heater to thereby control temperature of the air to be supplied to the passenger compartment;
means for operating the air-conditioner in a cooling mode in which temperature of the air to be supplied to the passenger compartment is controlled by controlling a cooling ability of the evaporator, a heating mode in which temperature of the air to be supplied to the passenger compartment is controlled by controlling a heating ability of the heater, or an air-mixing mode in which temperature of the air to be supplied to the passenger compartment is controlled by controlling positions of an air-mixing door; and
means for controlling the positions of the air-mixing door to gradually increase an amount of the cooled air to be supplied to the passenger compartment when the operating mode of the air-conditioner is switched to the cooling mode from either the heating mode or the air-mixing mode until an absolute value of a difference between a target temperature and an actual temperature of the air cooled by the evaporator becomes smaller than a predetermined value greater than zero.

9. An automotive air-conditioner comprising:
an evaporator for cooling air to be supplied to a passenger compartment;
a heater for heating air to be supplied to the passenger compartment; and
an air-mixing door for mixing the air cooled by the evaporator with the air heated by the heater to thereby control temperature of the air to be supplied to the passenger compartment:
means for operating the air-conditioner in a cooling mode in which temperature of the air to be supplied to the passenger compartment is controlled by controlling a cooling ability of the evaporator, a heating mode in which temperature of the air to be supplied to the passenger compartment is controlled by controlling a heating ability of the heater, or an air-mixing mode in which temperature of the air to be supplied to the passenger compartment is controlled by controlling positions of an air-mixing door; and
means for controlling the positions of the air-mixing door to gradually increase an amount of the heated air to be supplied to the passenger compartment when the operating mode of the air-conditioner is switched to the heating mode from either the cooling mode or the air-mixing mode to gradually increase the amount of the heated air until an absolute value of a difference between a target temperature and an actual temperature of the air heated by the heater becomes smaller than a predetermined value greater than zero.

* * * * *